United States Patent
Koppich et al.

(10) Patent No.: US 7,532,340 B2
(45) Date of Patent: May 12, 2009

(54) DOCUMENT MANAGEMENT SYSTEM RULE-BASED AUTOMATION

(75) Inventors: George Koppich, Palos Verdes Estates, CA (US); Michael Yeng, Mission Viejo, CA (US); Louis Ormond, Irvine, CA (US)

(73) Assignee: Toshiba Tec Kabushiki Kaisha (JP)

( * ) Notice: Subject to any disclaimer, the term of this patent is extended or adjusted under 35 U.S.C. 154(b) by 1048 days.

(21) Appl. No.: 10/125,856

(22) Filed: Apr. 19, 2002

(65) Prior Publication Data

US 2003/0200234 A1    Oct. 23, 2003

(51) Int. Cl.
*G06F 12/00*    (2006.01)

(52) U.S. Cl. .................. 358/1.15; 358/1.16; 707/10; 707/102; 707/205; 709/203; 709/214; 709/215; 709/218

(58) Field of Classification Search ................ 358/1.15, 358/1.16; 707/10, 102, 205, 203; 709/203, 709/214, 215, 218; 370/379, 382; 395/200.31
See application file for complete search history.

(56) References Cited

U.S. PATENT DOCUMENTS

| | | | |
|---|---|---|---|
| 5,371,888 A | 12/1994 | Lehnertz et al. | |
| 5,423,034 A | 6/1995 | Cohen-Levy et al. | |
| 5,666,490 A | 9/1997 | Gillings et al. | |
| 5,784,610 A | 7/1998 | Copeland et al. | |
| 5,802,253 A | 9/1998 | Gross et al. | |
| 5,850,526 A * | 12/1998 | Chou | 709/247 |
| 5,862,321 A | 1/1999 | Lamming et al. | |
| 5,892,909 A * | 4/1999 | Grasso et al. | 709/201 |
| 5,897,650 A | 4/1999 | Nakajima et al. | |
| 5,923,845 A | 7/1999 | Kamiya et al. | |
| 5,948,058 A | 9/1999 | Kudoh et al. | |
| 6,009,442 A | 12/1999 | Chen et al. | |
| 6,081,810 A | 6/2000 | Rosenzweig et al. | |
| 6,088,696 A * | 7/2000 | Moon et al. | 707/10 |
| 6,105,042 A | 8/2000 | Aganovic et al. | |
| 6,119,137 A | 9/2000 | Smith et al. | |
| 6,199,073 B1 | 3/2001 | Peairs et al. | |
| 6,216,122 B1 | 4/2001 | Elson | |

(Continued)

FOREIGN PATENT DOCUMENTS

EP    0 442 054 A2    8/1991

(Continued)

OTHER PUBLICATIONS

International Search Report related to PCT/US03/12372 dated Jul. 21, 2003.

(Continued)

*Primary Examiner*—David K Moore
*Assistant Examiner*—Peter K Huntsinger
(74) *Attorney, Agent, or Firm*—Tucker Ellis & West LLP

(57) ABSTRACT

A method and system is provided for automating management of document data in a document management system. The document data management automation system suitably permits document management system users to create and define rules for automated management of document data in the document management system. The rules are suitably created by selecting from a variety of criteria permit users to automate tasks that are performed on document data which is preferably received by the document management system.

14 Claims, 4 Drawing Sheets

U.S. PATENT DOCUMENTS

| | | | |
|---|---|---|---|
| 6,230,156 | B1 | 5/2001 | Hussey |
| 6,253,217 | B1 | 6/2001 | Dourish et al. |
| 6,266,683 | B1 | 7/2001 | Yehuda et al. |
| 6,289,460 | B1 * | 9/2001 | Hajmiragha ............... 726/28 |
| 6,308,179 | B1 * | 10/2001 | Petersen et al. ............ 707/102 |
| 6,370,538 | B1 | 4/2002 | Lamping et al. |
| 6,562,076 | B2 | 5/2003 | Edwards et al. |
| 6,868,451 | B1 * | 3/2005 | Peacock ..................... 709/231 |
| 2001/0014908 | A1 | 8/2001 | Lo et al. |
| 2002/0042815 | A1 | 4/2002 | Salzfass et al. |

FOREIGN PATENT DOCUMENTS

| | | |
|---|---|---|
| EP | 1 087 306 A2 | 3/2001 |
| WO | WO 02/25927 A1 | 6/2002 |

OTHER PUBLICATIONS

Groupwise 5.5 Software Manual; pp. 1-101.

Supplemental European Search Report, European Application No. 03 72 6392. Feb. 2, 2006.

Teege G "Feature Combination: Position Paper About Composability Issues in Object-Orientation", Proceedings ECOOP. Workshop on Composability Issues on Object-Orientation, Jul. 9, 1996, pp. 1-6, XP002151010.

* cited by examiner

DOCUMENT MANAGEMENT SYSTEM RULE-BASED AUTOMATION

BACKGROUND OF THE INVENTION

This invention is related to document management systems, and more particularly, to a rule-based automation system for a document management system.

Because enterprises around the world are recognizing that information is the currency of their business, there is tremendous value in ensuring that all corporate information, whether in structured or unstructured formats is captured, managed, and put to work in a meaningful and efficient way. Document management and content management solutions help organizations maximize the use of their unstructured data, which in turn helps maximize the use of their corporate knowledge. Unstructured data is information stored in text files, emails, documents, multimedia, etc.

Document Management Systems provide organizations with an ability to create centralized repositories, or libraries, containing all of the unstructured data they generate. Powerful search and retrieval tools make this information easily available for use and collaboration across the entire enterprise. These tools often provide security and version control capabilities. However, storing and retrieving large numbers of paper documents has, in the past, been an onerous task. Present document management systems solve some of the problems faced by organizations that use a manual document filing system alongside an electronic document system. These systems provide a method for combining both computer-generated image documents and paper documents in a secure document storage and retrieval system.

Document management systems provide a means for freeing up storage space and reducing the costs of paper document copying and distribution. They often provide multiple methods of adding documents and indexing information to the document management system while facilitating easy revisions, creation of new versions, annotation, and document sharing. One of the most important aspects of document management systems is their ability to eliminate time-consuming physical searches for misfiled or lost documents. Some document management systems allow users to save various types of documents in a single location (i.e. related client emails and Word documents in the same folder). Furthermore, they provide companies with an ability to back up all essential business documents, both scanned and computer-generated, and may integrate optical character recognition ("OCR") technology so that full text searches may be performed on scanned documents.

In popular operating system ("OS") platforms (e.g., Microsoft Windows family), a user navigates the local file system using the integrated OS file management system (e.g., Windows Explorer). Through the use of this tool, documents can be manipulated in a variety of ways, e.g., moved, copied, and deleted. Many computer users have grown accustomed to using integrated file management systems, and are thus reluctant to switch to another file management tool to perform these operations. Document management systems from third-party vendors generally provide enhanced file management systems. In providing such enhanced file management systems, document management systems generally provide a separate user interface for invoking their enhanced functionality. It would be preferable if document management systems provided users with a convenient method of accessing their enhanced system functionality from within an existing integrated OS file manager such that users are not required to navigate another interface.

In addition, a benefit of document management systems is that they facilitate collaboration. One such method of facilitating collaboration is providing versioning control for documents managed by document management systems. Another such method is providing document distribution functionality so that one user can easily share documents with or send documents to other users, devices or systems. Unfortunately, the document distribution functionality of document management systems generally calls for a user to manually select an appropriate distribution function for each document in the document management system. It would be preferable, however, if document distribution functionality provided users with the ability to automate document management upon receipt of a document.

BRIEF SUMMARY OF THE INVENTION

According to the present invention, there is provided a method for processing documents managed by a network-based document management system. The method comprises the step of defining at least one rule for application to document data received by a document management system. The rule suitably comprises at least one condition based upon at least one property and at least one action. The method also comprises the step of examining document data received by a document management system. Further, the method comprises the steps of determining if the examined document data matches the at least one condition of the at least one rule, and applying the at least one action of the at least one rule to the document data.

Also according to the present invention, there is provided a system for managing documents. The system comprises a document management system for receiving routed document data from the at least one network device. The document management system suitably comprises computer-readable code for defining rules having an action and at least one condition based upon at least one property, computer-readable code for examining document data received by the document management system, computer-readable code for determining if the examined document data matches the at least one condition of the at least one rule, and computer-readable code for applying the at least one action of the at least one rule to the document data.

DETAILED DESCRIPTION OF THE INVENTION

The document management system preferably provides access to a document management repository via a folder incorporated into the existing OS file structure. Although the present invention is described as enabling users to access document management functionality from a Microsoft Windows OS, it will be appreciated to those skilled in the art that the present invention is also suitably designed to interact with any OS, such as Unix, Linux, Macintosh or other OS. In one embodiment, the document management platform ("DMP") provides access to network-based documents via a browser, such as Internet Explorer or Netscape.

In the presently preferred embodiment, a document repository managed by the DMP is represented as a folder within an Internet Explorer window. The DMP permits a user to perform at least the following operations on the repository folder, preferably insofar as the user has the appropriate access rights (these operations may be challenged via an account username/password request): expand the folder tree structure, view folder properties, delete a folder, rename the folder, copy the folder, move the folder, drag-and-drop a document, delete the document, rename the document, copy the document, move the document, view document properties, and view the document content as read-only. Additional document management functionality is suitably made available to the user, as will be appreciated by those skilled in the art. When a document is moved or copied from one location to another within the DMP repository file structure, the document, as well as its meta data, are suitably "moved" or "copied". When a document is moved or copied to a location outside of the DMP repository, the document content, and not its meta data, is suitably moved or copied (this operation is functionally equivalent to a download operation).

Figure 1:
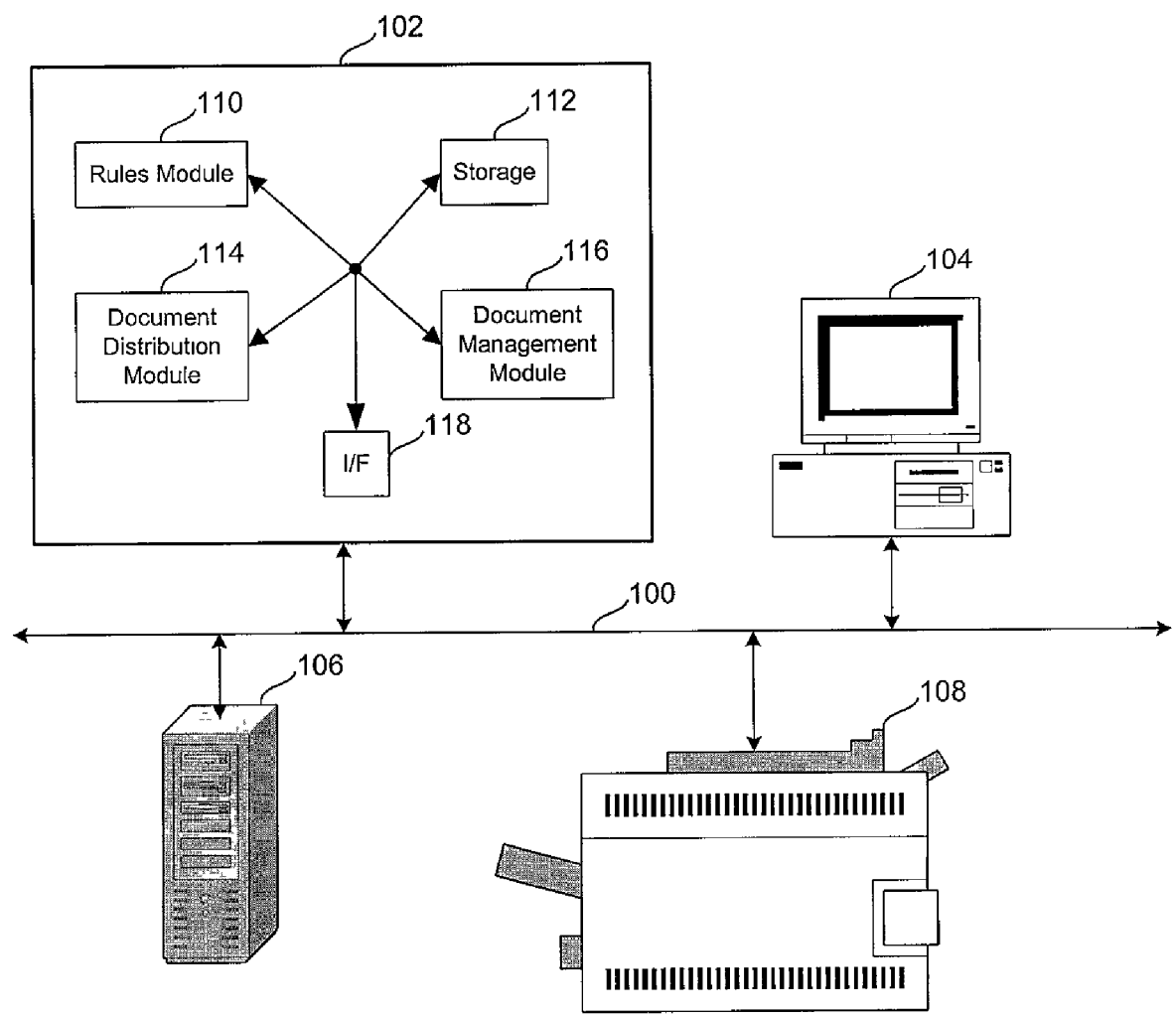
FIG. 1 illustrates an example of a network system for implementing the present invention.

Referring now to FIG. 1, an illustration of a network environment for practicing the present invention is provided. The system comprises a data transport network 100 illustrative of a LAN or WAN environment in which a preferred embodiment is provided, such as a packet-switched TCP/IP-based global communication network. The network 500 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art.

Connected to a data transport network 100 is a document management platform ("DMP") 102. In the presently preferred embodiment, the DMP preferably is a plug-n-play device having a hardware component consisting of a closed-box server that is easy to install, configure and support, and software components, both of which will be described in greater detail hereinbelow. The DMP is suitably operable to provide services to one or more computers 104, one or more DIDs 108, and/or one or more Servers 106 connected to network 100. It is suitably a document distribution solution with document management capabilities.

The DMP 102 suitably replaces or supplements existing fax, print and email servers, and preferably offers a more efficient method of transmitting, tracking and storing business-to-business documents. The DMP 102 is preferably a client/server system, which is suitably implemented in both single and collaborative corporate workgroups (although not limited to such environments) and designed to increase productivity and reduce costs by making document communications more simple and reliable. The DMP 102 suitably provides functionality enabling users to share documents and conduct collaborative work between various workgroups. For example, collaboration between sales and accounting can occur when issuing customer quotes, generating offers or approving a credit line, tracking job costs, and charging back users.

One example of enabling DMP functionality is the ability of the DMP 102 to transmit documents that critically impact business operations. These critical documents can be from, but are not limited to, the following functional areas of a business: Sales, Accounting, Purchasing, Engineering, Warehouse, and Human Resources. All of these documents are representative of critical business processes. The DMP 102 preferably comprises a job routing component that allows a user to direct jobs to one or more Multifunction Peripheral devices ("MFP"), DIDs, or other LPD-compliant devices, to faxes, e-mail and web servers. An LPD-compliant device is a Network Print Server (i.e., Line Printer Daemon (or spool area handler)) that allows access to printers from a local computer across a TCP/IP network, e.g., the Internet.

Also connected to data transport network 100 is computer 104. The computer 104 is suitably either a server or client running on any OS, such as Windows NT, Windows 2000, Windows XP, Unix, Linux, Macintosh or other operating system. In addition, the computer 104 is suitably a thick client or thin client, as will be appreciated by those skilled in the art. For example, LAN environment, the DMP 102 provides services from a "thin" browser-based client. The disclosed DMP architecture is suitably accommodating for a "thick client" driver-based computer 104 and for a "thin client" browser-based computer 104.

Connected to data transport network 100 is also DID 108. The DID is suitably a device such as a printer, fax machine, scanner, copier, multi-function peripheral ("MFPs"), or other like peripheral devices. The DID 108 is suitably any networked DID as will be appreciated to one of ordinary skill in the art. The DID 108 preferably has an internal device controller suitably acting as a fully functional server with the necessary hardware and software that ensure proper operation of the DID 108 as will be appreciated by those skilled in the art. In addition, the DID 108 preferably comprises internal storage, which is suitably a hard disk and random access memory ("RAM") as will be appreciated by those skilled in the art.

Optionally, a server 106 is also connected to data transport network. Because both the DID and the DMP suitably have server functionality, an additional server is not necessary to practice the present invention. However, corporate networks rarely have only one server, and often have more than two servers, wherein the servers may be configured to perform different tasks. The server 106 is suitably any fully functional server with the necessary hardware and software to ensure proper operation. The server 106 is suitably a database server configured for selective query support, selective data access, data archiving, and like, an email server, an application server, or any server configured for performing a function across a network.

The DMP 102 preferably comprises a Document Distribution Module ("DDM") 114 a Document Management Module ("DMM") 116, and a Rule Module 110 ("RM"). It should be noted that that the DMP 102 is not limited to these particular modules, and suitably comprises additional modules for device management. The main function of the DMM 116 is to store documents in a central document repository and to facilitate user capability to modify documents, collaborate during document editing, and search and locate stored documents. The main function of the DDM 114 is to route jobs to their destinations such as DIDs, servers, computers, a document repository, etc. The main function of the RM 110 is to provide automation for the DDM 114 and DMM 116.

The DDM 114 interfaces with the DMM 116 to distribute documents in native file formats, or as image files, such as PDF, TIFF, JPEG, GIF, and the like. The DMP 102 also suitably comprises internal storage, in which a document repository is suitably maintained. The DMP 102 preferably interfaces with data transport network 100 via network interface 118. Thus, the DMP 102, server 106, computer 104 and DID 108 are in shared communication.

The computer 104 suitably represents either a thick client or and a thin client with general interfaces to the DMP 102. The computer 104 interfaces with the DDM 114 for document distribution to selected devices. The DDM 114 suitably reports back to the computer 104 the status of the documents forwarded to the DDM 114 for distribution. Documents received into the DDM 114 are preferably spooled within the DMP 102.

The DMP 102 preferably functions are a fully functional server in a client-server architecture and the computer 104 acts as a client. One of the primary functions of the DDM 114 is to route jobs to various destinations such that it interacts with virtually any type of client OS (e.g., Windows, Unix, Mac, Linux, etc.) without requiring a user to have special skills. As described hereinabove, there are two types of clients available: the thick client (i.e., operating through a printer driver), and the thin client (i.e., operating through a browser. After receiving jobs from a computer 104, the DDM 114 preferably routes the jobs to their final destination, which is suitably internal or external. Thus the DMP 102 becomes the focal point for monitoring and controlling delivery of jobs to their respective destinations. User at computers 104 can preferably create routing profiles, which simplifies the process of submitting multiple jobs to the same destination. Such destinations suitably include DIDs (network printers, fax, scanners), email servers, web servers, document repositories, etc.

To route a document via the thick client 104, a user preferably opens a document in its native application, and selects a File/Print menu. As a next step, the user selects a routing destination. For each selected routing destination, user suitably the following options: destination-type(s), specific destination(s), properties of the specific destination, or alternatively, to avoid navigating the property screens, select and load a previously-stored job delivery profile. The user can also store the current job profile.

A thin client computer 104 is suitably capable of sending documents to any of the destinations that are accessible via the thick client. One distinction between the interaction of a thin client with the DMP 102 and a thick client with the DMP 102 is when a document is delivered to its destination from a thick client it is delivered in a format different than the native document format. When a thin client delivers a document to a destination, it suitably arrives at its final destination in its native or original format.

As disclosed, the computer 104 communicates documents and files through the DDM 114 to several destination devices. The primary function of the DDM 114 is to send a document from the DMP 102 to a specified destination, which is accomplished in a succession of major functional steps. In a presently preferred embodiment, the DDM 114 comprises a spooler, a Job Manager ("JM"), a Messaging Server ("MS"), and a Document Queue Manager ("DQM"). A document from a computer 104 (a thin client or a thick client) is received into the DMP 102 at the spooler. As mentioned hereinabove, the thin client 104 is browser-based, thus the document is selected via a browser and suitably transmitted to the DMP 102 via a browser client (e.g., HTTP client software) to a spooler. A thick client is also suitably operable to send documents to a spooler utilizing conventional printer protocols (e.g., LPD for Unix, and SMB for Windows). The spooler, in turn, preferably sends a message to a JM to create a new job. A MS preferably provides messaging services between all of the components of the DDM 114. The JM suitably creates a job by passing a request to a DQM. The DQM creates a job record, and returns a job-ID to the JM and further, back to the spooler. The spooler passes the document to queues maintained by the DQM. Once the spooler finishes spooling the job, it sends a message via the MS to the JM.

For example, if the job type is a "web post" function, the JM notifies a corresponding converter of the arrival of a new job. A PDF converter suitably retrieves the document from the appropriate job queue, notifies the JM, and performs the corresponding conversion. Once the conversion is completed, the PDF converter suitably places the document back in the queue, and a notification is sent to the JM. Similarly, if the print job requires G3/G4 conversion, the job is suitably sent to a G3/G4/TIFF converter. Once converted, the G3/G4/TIFF converter places the document back in the queue, and a notification is sent to the JM.

If a job is ready (i.e., spooled and/or converted), the JM sends a message to a Distribution Agent. The Distribution Agent retrieves the job from the queues 410, and sends it to the respective destination (e.g., Web, fax, printer, DMM, e-mail server, etc.). Once the JM completes processing a job, the event is suitably logged by a Log Manager ("LM") component.

The JM suitably maintains job information in the job record, which job record comprises the following fields: Job Name, Job Id, Job Owner, Department Name, Job State, Destination, Submission time, Start processing time, Completion time, Page count, Size. The JM does not send the job to the physical destination if the destination is not ready. For each destination type there is an agent program that is responsible for routing the job to its final destination. These individual agents (Print Agent, Mail Agent, Fax Agent, Web Post Agent, Scan Agent) are responsible for notifying the JM if the job was successfully delivered. As a result, the JM suitably provides a user with job status information, and notify the user if the job was successfully delivered or if error conditions were encountered. If errors are encountered, the respective agent retries to deliver the job. The job is discarded after a predetermined number of retries is exceeded. The JM saves the jobs received by the DMP 102 for a predetermined period of time.

The DDM 114 suitably comprises a Print Agent ("PA") for delivering a document to a print destination or to the DMM 116. This is accomplished by examining the respective job record and identifying the destination name, destination type and/or user name, which information is provided by the computer 104. If the destination type is for printing the job (i.e., in response to a "print" function), the PA suitably determines other details, such as queue name, and printer hostname/IP. If the destination type is stipulated as the document manager, the only information that needs to be provided by the computer 104 is the username. When a print destination is created, the attributes of the newly created destination are stored in a repository preferably housed on the storage 112 of DMP 102. Once the destination attributes are resolved, a destination router then suitably routes the respective job to its destination (e.g., "LPR"—an off-line print command that associates a printer in the Unix OS, "smbspool" for SMB, DMM for the DMM 202, MAC for an Apple output device, etc.).

The DDM 114 also suitably comprises a Mail Agent ("MA") for mailing a document (in either native or image format) received at the DMP 102 via an on-board send mail server (similar to an internal SMTP server) or an externally configured SMTP mail server. The MA is also responsible for fetching incoming mail from an external POP3 (Point-of-Presence version 3) mail server. As soon as a user logs in to the network 100, the DMM module 116 preferably sends a message to the MA via a messaging server to register the user as a logged-in user, and to fetch any newly arrived mail. Newly retrieved mail is preferably stored in a user DMM inbox via the DMM 116. When the user logs out, the DMM 116 preferably sends a message to the MA via the a messaging server to de-register the respective user.

The DDM 114 suitably further comprises a Fax Agent ("FA") for faxing a document via the internal fax modem or via an external fax server, such as exist on DIDs. Incoming faxes are preferably sent from the FA to the DMM 116. All incoming faxes are distributed to a common fax inbox, from where the fax documents are automatically or manually moveable to a user inbox. Support for incoming faxes is provided for various vendor DIDs (with fax unit installed) and for an on-board fax modem. Outgoing faxes are sent from the FA to the internal fax modem for transmission therefrom. Support for the external fax server is achieved via the vendor provided fax driver.

The DDM 114 also comprises a Web Posting Agent ("WPA") for posting a document to a Web site. When a job is identified as a "Web Post", the DMM 116 sends the job to the WPA. The WPA in turn gets the address of the Web destination and sends the document, along with the document meta data, to the identified Web destination. The following components are preferably installed on the website hosting the Web postings: Web Server software, a Web Post Receiving Agent, a Web Post Repository Manager connected to a Web Post Repository for storing website information, and Presentation Scripts.

The Web Post Receiving Agent, at the posting destination, receives the document sent by the WPA and stores it in the file repository using a Web Post Repository Manager. The Web Post Repository Manager maintains the posted documents, as well as the corresponding meta data, in a Web Post Repository. The user posts a document by using the computer 104. If documents are submitted for posting via a thick client, the documents are converted to PDF format. On the other hand, if the documents are submitted via the browser-based thin client, the documents are posted in the source format. The Presentation Scripts, via the Repository Manager, suitably provide the user with access to the posted documents.

The DMP 102 creates a posting container or box for each user. The posting box is automatically created when a user first posts a document to the web. A user who accesses the posting box via a thin client is able to view either the list of all posted documents or a list of documents posted on the current day, current week, or current month. The user can also delete documents contained in his respective posting box or view the attributes of a posted document.

The DDM 114 also comprises a Scan Agent ("SA"), which is preferably a separate application configured to run a supported MFP device, or DID. A DID controller suitably controls onboard functions of the DID, including processing of documents into images (rasterizing). The rasterized image file is then stored by a DID controller in a scanned image folder. The SA suitably monitors the scanned image folder and, as soon as an image file is placed in the folder, the SA initiates a document transfer to the DMM 116. Based on the username provided by the SA, the DMM 114 stores the document in a user inbox folder, from which a user can then retrieve the document image for processing.

The DMM 116 work with the DDM 114 and its components to enables users to quickly store and retrieve documents from a central repository, which is preferably stored in storage 112 on the DMP 102, but is also suitably stored on any storage device in communication with data transport network 100. The repository allows a user to share documents and conduct collaborative work between various workgroups. Users of the DMP 102 preferably utilize a browser-based Graphical User Interface (GUI) from a computer 104 to access documents stored in a repository. The DMP 102 preferably offers support for conventional browsers, e.g., Microsoft Internet Explorer and Netscape Navigator, through an internal web server which is accessible from a thin client via a browser using the HTTP protocol. A WebDAV (Web Distributed Authoring and Versioning) client suitably communicates with the web server utilizing HTTP and WebDAV protocols. WebDAV is a two-way protocol designed to support editing of Web sites and handling of meta data.

When the DMM 116 receives a document in image form, such as it would from a fax or scanning device, it suitably routes the image to the repository for storage. The image can also be forwarded to the DDM 114 for further routing to an output device, e.g., a printer. In addition, the image file is also suitably routed to other document management systems ("ODMP") of a remote appliance over the network, and preferably ODMA compliant. A document received via email device is suitably processed as text or an attachment to a message and forwarded to the DMM 116. Both an image and a processed email document can be routed to the printer, repository, and ODMP, and/or other output devices via the DDM 114.

As mentioned hereinabove, the DMM 116 has the main function of storing and organizing user documents. A user can send/file documents to the repository utilizing any of the following agents: for an incoming fax—DMM Fax Agent; for Print to DMM—DMM Print Agent; for an incoming email—DMM Mail Agent; and for scanned documents—DMM Scan Agent. Each agent is configured to transfer a document to the DMM 116, which stores and organizes the document accordingly. When the DMM 116 receives documents, it suitably stores them in personal storage, depending on the documents purpose.

Figure 2:
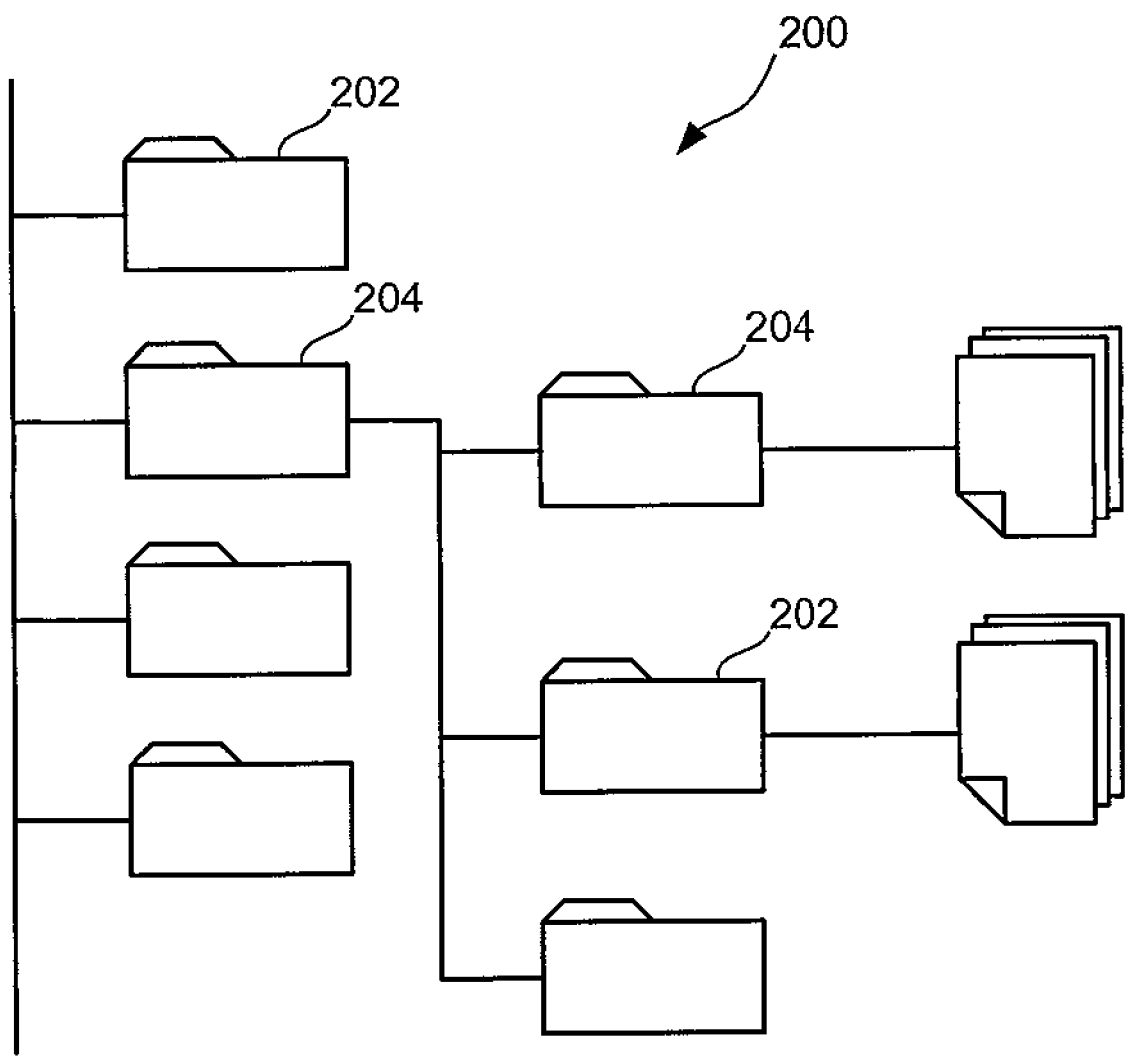
FIG. 2 illustrates a hierarchical tree structure of a repository in a document management system.

Referring now to FIG. 2, there is illustrated a hierarchical folder tree structure of a repository according to the present invention. The repository 200 is suitably comprised of a plurality of file folders. Users can browse through the repository 200 to access file folders and documents. Authorized users can create a hierarchical tree by creating new file folders and documents. Each file folder suitably contains both file subfolders and documents. A user is presented with file folders of two types: a private folder 202 and a group folder 204. The private folder 202 allows only the folder owner access this type of file folder. The folder owner has all rights on the objects contained in it. The private folder 202 is suitably created when an Administrator creates the user account. The group folder 204 is visible to users belonging to the group(s) assigned to this file folder. The operations that a user can perform on objects contained in the group folder 204 are limited to the access rights inherited from the respective group.

As long as a user has the proper access rights, he or she can perform a number of file folder operations. The user can create a file folder. An Administrator can create new folders in any section of the repository 200. Non-administrative users have this option available only if their access rights include editing on the file folder in which they want to create the new file folder. After selecting the menu option for creating a new file folder, the user is presented with an interface to specify the new name of the file folder. If the new name is not valid, the file folder will not be created and the user is notified with the proper error message. The user can also assign a comment, access rights to users and groups, and indexes.

The user can view the properties of a file folder by selecting the respective folder from the repository 200. The following folder properties are suitably supported: access permission, attribute, available space, comment, last update, name, owner, creation date, size, and combinations thereof. It should be understood that other folder properties are also suitably included in the list of supported folder properties.

By selecting a file folder 202 or 204 from the repository 200, the user is suitably presented with a view of the folder's properties and an option to change the properties. Assuming the user has the proper rights, a user can delete a file folder 202 or 204, including any subfolders and files contained within the folder to be deleted. To delete the file folder, the user suitably selects the file folder 202 or 204 from the repository 200 and selects a Delete menu option. In addition, a user can browse a file folder by selecting the respective folder in the repository 200, an action that results in the display of the objects contained in the folder.

For searching purposes, the user can assign index information to newly created file folders. The index information that can be associated with a folder suitably includes: Department, Group, Language, Project, Purpose, Status, and Priority, etc. The user can display the index information associated with the file folder, and with sufficient rights, modify index values already associated with the file folder.

Users can also copy information from one file folder to another. After selecting the source file folder and the destination folder, the user can initiate a copy operation by selecting the Copy menu item. The user can copy a file folder only if the user has Edit access rights on the destination object. Similarly, after selecting the source file folder and the destination folder, the Move operation is initiated by selecting the Move menu. Preferably, the user can move a file folder only if the user has Edit access rights on both destination and source objects.

The user can also search a file folder. Numerous options are available to the user who wishes to perform a folder search. The user can specify the index information, attributes, or content data in combination with logical operators such as AND, NOT, OR, Not Equal, Max, Min, and is allowed to enter wild card characters for specific attributes. The user can specify the index information, attributes, or the content data, while using wild card characters for specific attributes. The user can limit the search to a specific file folder, a branch, or the entire hierarchy. The user has the option to save the search queries for use at a later time, and to retrieve the saved search queries for use. The search result depends on the above-specified criteria, and contains the list of file folders with some visible properties such as Name, Creation date, number of documents, etc.

The user can capture the document from a local drive or network hard drive utilizing an interface suitably implemented to allow the user to browse such devices and for selecting the document. This is also called an upload operation. The interface allows the user to then point the destination folder, and perform, e.g., copy or move operations to place the file in the destination folder.

Also, the user can capture input/output from a scanner. The paper documents scanned by the user are converted to an image format and are stored in the user's personal storage, or Inbox folder. The user has an option of moving the document from his/her inbox to a particular file folder in the repository.

Furthermore, the user can capture output from a fax. Paper documents faxed by the user are converted to an image format and stored in the user inbox. The user then has an option of moving the document from the Inbox to a particular file folder in repository.

Additionally, the user can capture from email as both text and an attachment. A document sent via email is stored in the user inbox. The user has an option of moving the document from the inbox to a particular file folder in the repository.

The user can capture files from servers disposed on the Internet. The GUI provides the capability of specifying the URL of the source document(s) and the destination file folder. The user can also specify how deep to traverse the URL. The DMP 202 then facilitates download of the specified documents for storage in the specified folder.

The user can also create new documents from current documents, and save the new documents a different format. The following format conversions are available to users: PDF, PNG, TIFF, HTML, BMP, JPG, etc. A new document can be created by merging several documents such that the final document is a multi-page image document). Using image files, a user has an additional option of rendering the image files to text through optical character recognition ("OCR") software.

After selecting the source document and the destination folder, a user can copy a document, but only if the user has edit access rights on the destination object. Likewise, a user can move a file folder, but only if the user has Edit access rights on both the destination object and the file folder containing the document.

If a user edits a document, he can save the edited document utilizing the following supported options. The document can be saved by replacing the original document with the edited version of the document by overwriting the original document. This operation does not create a new version of the document. The document can be saved along with its meta data to an attached storage device (e.g., hard disk). The user has two options for performing this operation. First, the user can select one or more documents from the repository 200, and then select a "Save" menu option. Second, the user can select the "Save" option from inside the document viewer to save the document to selected ones of destination storage devices attached to the DMP 102. The user can save the document to an external Electronic Document Management System ("EDMP") like Microsoft Share Point, Lotus Notes, TABS Top Access Composer, Questys, other online document management systems, as will be appreciated by those skilled in the art. As described hereinabove, the user can perform this operation for either multiple documents or for a single document by opening it in the document viewer such that the external EDMP system can be specified. It is preferable that the external EDMP destination should be compliant with Open Document Management API ("ODMA").

Authorized users can perform the following operations support of document versions. A document can be checked out of the system, i.e., the latest version of a document can be retrieved for editing purpose. The user selects the document from the repository 200 and selects a "Checkout" menu option. After checking out the document, the user gets the latest version of the document (download) or simply checks out the document. In the later case, the document is not downloaded to the client machine. The check out operation marks the document as locked for the user who checked out the document. As long as the document is checked out, other users are not able to edit the same document. The user can view document status and properties. The status information is represented by visible properties including version tag, version comment, version date, and the name of the user who checked out the document.

Users can check-in a checked-out document such that the document is saved as a version of the original document. After making modifications to the local copy (retrieved via check-out operation) of the document, the users can then check-in the document. During the check-in operation, the user can either upload the local modified copy of the document or simply check in. In the first case, a new version of the document will be created by the DMM 116, with the currently uploaded version as the latest version of the document. In the second case (i.e., check in), a new version is not created, but the status of the document is changed from "check out" to "check in", and the document will be unlocked for access by other users. The user also has an option of using WebDAV-enabled client applications to access documents stored in DMM 116.

Figure 3:
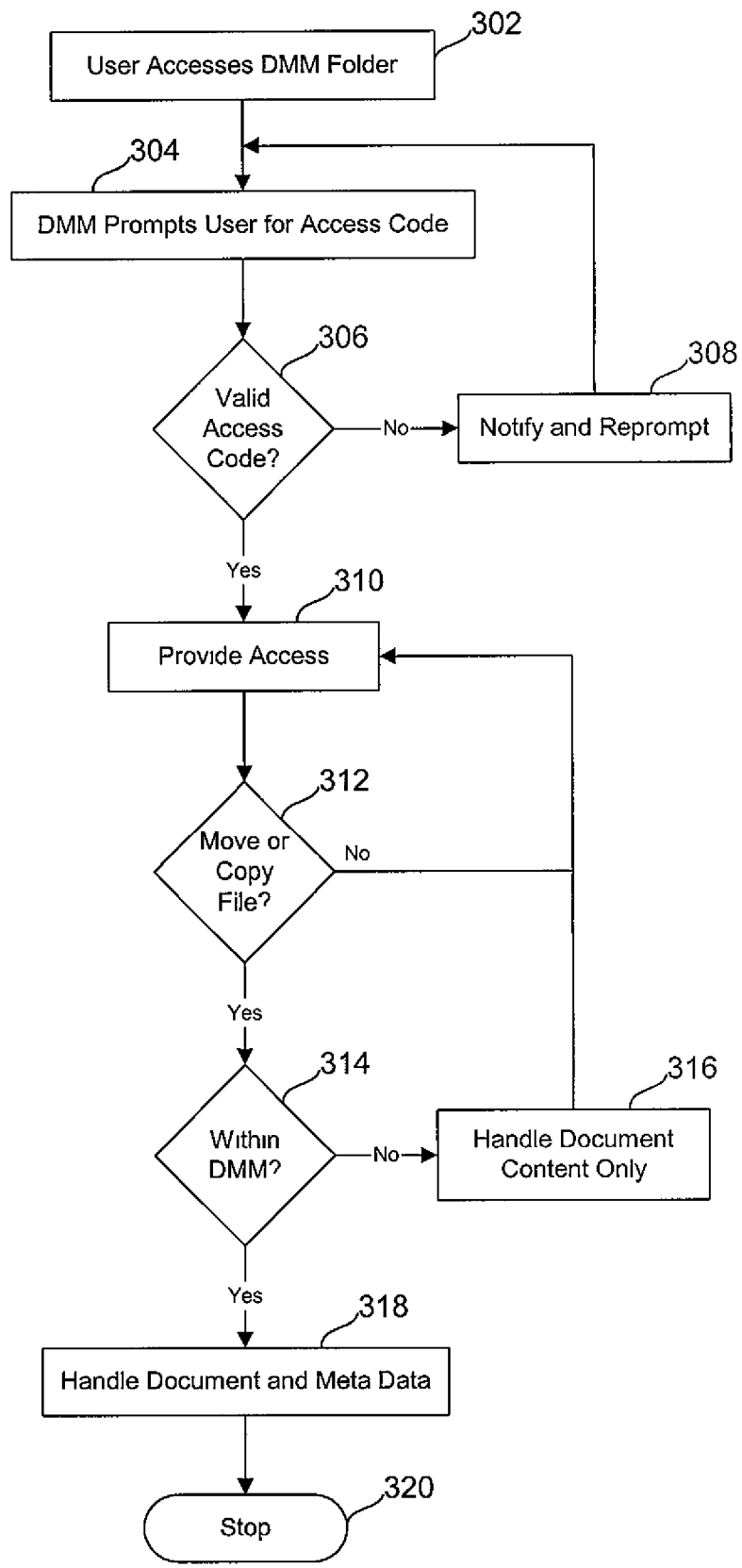
FIG. 3 illustrates an overall block diagram of the subject invention for implementing rule-based document management.

Referring now to FIG. 3, there is illustrated a flow chart of the process for moving a document according to the present invention. Flow commences at process block 302 where the user accesses the repository folder. If the user is not currently authorized to access the folder, the DMP 102 prompts a user to provide a username and password to again access. User rights to the folder are suitably assigned by an Administrator in accordance with the level of access provided to that particular user. For example, the user may be granted full access to his or her documents in private folders, yet restricted to a lesser read-only access to documents in the group folder. The Administrator can set the rights to any user, and to any document location. Note that the username/password login can be implemented as a single login coinciding with the network login, or as separate logins. Thus when the DMP 102 prompts the user for a username/password as a separate login procedure, flow progresses to decision block 306 wherein a determination is made whether the access code or login is valid.

A negative determination at decision block 306 means that the user entered invalid login information, which causes progress back to process block 304, where the user is again prompted to enter a valid access code or login.

A positive determination at decision block 306 means that the user entered a valid login, which causes progression to process block 310 wherein the user is provided access to the repository. The user is suitably granted access in accordance with the rights assigned by an Administrator and associated with the login information provided by the user.

Flow then continues to decision block 312 wherein a determination is made whether user wishes to move or copy a file from one location to another. A negative determination causes progression to flow back to process block 310 wherein the user maintains access to the repository.

A positive determination at decision block 312 means that the user is attempting to move or copy a file from the repository. At this point, progression flows to decision block 314 where a determination is made whether the destination of the file is within the DMM. A negative determination at decision block 314 means that the user is attempted to move or copy a file from the repository to a location outside of the repository. This causes progression to process block 316 wherein the DMM handles only the document content when moving or copying the file. This operation is equivalent to a document download operation. Flow then loops back to the input of decision block 310 wherein the user maintains access to the repository for the next document handling process.

A positive determination at decision block 318 means that the user is attempting to move or copy a document from a first location in the repository to a second location in the repository. This causes progression to process block 318 wherein the DMM handles both the document contents and meta data. Flow then continues to termination block 320.

In addition to moving and copying documents, the user is also provided with a mechanism for collecting user deleted files in a special holding area until the files have reached a predetermined age or, the storage area fills up and the files are discarded to create room for new files. The user can then monitor the status of the storage area and provide data such as space utilization. The user can monitor relevant activities and operations, and at a minimum, can record significant events, such as, document deletion, document check in and check out operations, document printing, login/logout activity, file storage space utilization, and archive/restore operations.

The user can specify the activities and operations to be monitored, and retrieve a record of these events by specifying a filtering criterion. The criterion includes the activity to be monitored, as wells as the monitoring period of time.

The user is provided with the capability to generate alerts for specific events such as New Document In personal storage (Inbox), Low File Storage Conditions, Failed Logon Attempts, Exceeding Threshold, etc. E-mail and/or Popup windows inform the user of these alerts. Authorized users can initiate printing of the documents stored in DMM repository.

For each account, the DMP 102 generates at least an Inbox and Private file drawer. These containers are visible and accessed through the browser interface of the DMM 116. The Inbox is the destination for all the documents arriving from outside at the DMM 116. A creator/owner of a DMM group file folder awards access rights to the respective folder by associating it with defined groups/users and access rights. The respective user selects a folder, and from the list of available groups/users, selects a particular group/user and then assigns the desired rights. If no explicit action is taken to assign rights to a container, then the rights are suitably inherited from the parent container (a folder inherits from its parent folder and a document from its parent folder).

The present invention provides users with a means for distributing documents to multiple destinations. Currently Windows applications send a document only to one destination device. To foreclose on such conventional limitations, the DDM 114 of the disclosed appliance architecture provides the capability of distributing a document substantially simultaneously to multiple destinations of different types including printers, faxes, web servers, and the repository via the DMM 116. On Windows platforms this is accomplished by a generic print driver which repeatedly invokes specific print drivers. The user is provided the capability to select one, a few, or all of the available destination types (i.e., Printer, E-mall, Web Post, Fax, DMM, etc.), and any number of devices within each device category. After a user selects one or multiple destinations, a dialog box is displayed that allows the selection of vendor-specific destination properties. The user is offered the opportunity to store all of these settings in a profile file that can be used to simplify subsequent "Print File" operations. Once these properties are set, the user exits these screens by selecting the "OK" button. In accordance with prior destination selections, the "Print File" operation is initiated by repeatedly invoking the corresponding print drivers.

As a prelude to initiating multiple-output-device printing, the user generates a document within an application (e.g., a Windows word processing application). When the user desires to output the document to multiple destinations, he or she directs the output to the disclosed DMP 102, preferably via a File-Print menu. When the destination devices have been selected, and the user initiates the document transfer, the document is sent to a component of the computer 104 OS for conversion. When using the Windows OS, the component is called the Graphic Device Interface ("GDI").

The GDI renders the image as an intermediary vector-based enhanced meta file ("EMF") and passes the corresponding data stream to the spooler, which preferably converts the EMF to a output file as a background operation, so the user can continue working on applications in the foreground. The spooler comprises the print processor that processes the received EMF file into multiple files according to the number of selected destination devices. For example, if the user selected as destination output devices a fax and a printer, the print processor suitably generates an output file for each output device. The spooler suitably receives an EMF file and passes it to a the print processor, which plays back the EMF file to each selected device.

In a presently preferred embodiment, a driver for selected device receives a played back file from the GDI module. A GDI rendering engine ("GRE") works with the drivers to generate the output file. The output from the each printer graphics DLLs is raw data to a port monitor. The port monitor routes the raw data via the kernel-mode driver stack to the DMP 102. The DMP 102 then distributes the respective document files to the multiple destination devices.

Note that the disclosed architecture is not restricted to wired networks having a client, the DSM 102, and numerous destination devices disposed thereon. The client may be any wireless portable device, such as a portable computer, running an OS suitably configured and operable to connect to a network access server to gain access to network services. The wireless device may also be hand-held device such as a Personal Data Assistant running any OS and suitably configured to communicate with the disclosed appliance system to receive the benefits thereof.

While the DMM 116 provides users with a simple interface for accessing document management functionality and the DDM 114 provides users with a means for concurrently distributing documents managed by the DMM 116 to multiple users and multiple devices, the present invention also provides a means for automating document management and document distribution. The DMM 116 suitably receives documents and stores them in a user's inbox. The present provides functionality embodied in a Rules Module ("RM") that permits the owner of an Inbox (a user) to define conditions and rules for automated management and/or distribution of documents received at an Inbox based on a plurality of factors.

Figure 4:
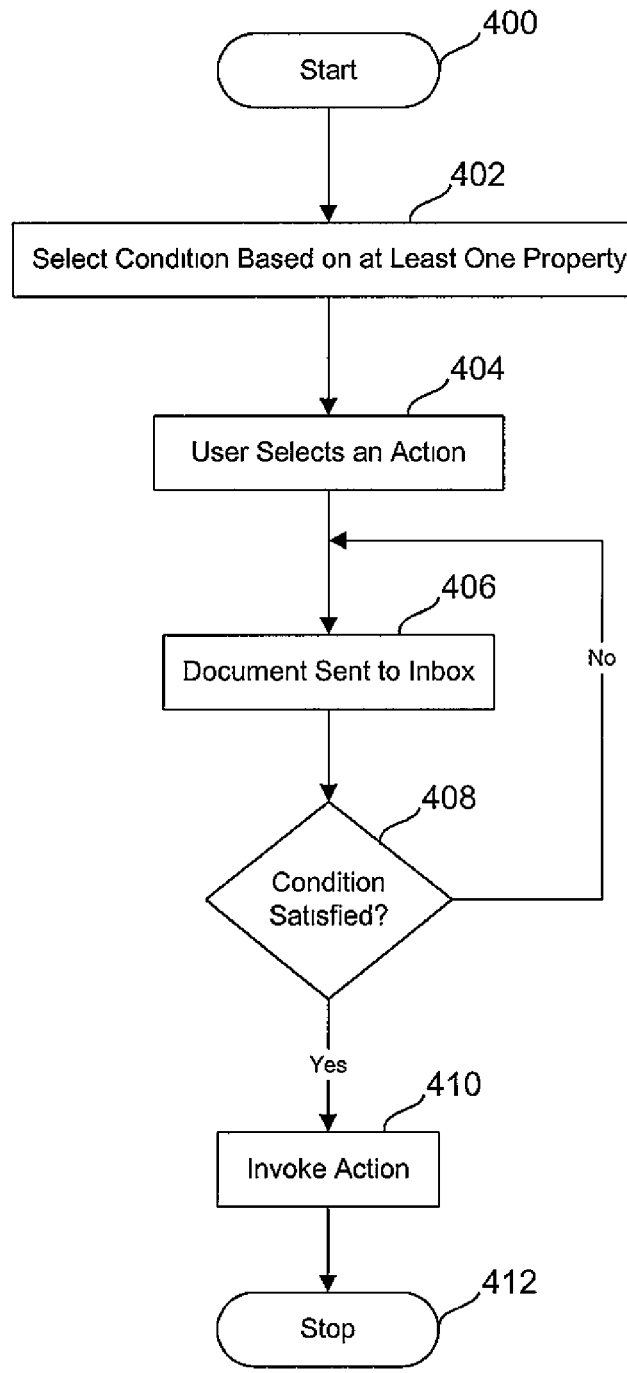
FIG. 4 illustrates an overall flowchart for implementing automation of distribution and management of documents according to the present invention.

Turning now to FIG. 4, there is illustrated a flow chart for invoking automation of distribution and management of documents according to the present invention. Flow commences at start block 400, from which progress is made to process block 402. At process block 402, at least one condition based on at least one property is defined. According to a presently preferred embodiment, the at least one condition based on the at least one property is defined through the implementation of computer-readable code, which is preferably stored anywhere on a data transport network, such as represented by data transport network 100, and is accessible to both a user, such as by way of a computer 104, and a DMP 102. The computer-readable code is suitably code in any language, is preferably compiled, and may be in the form of a software component. A software component ("SC") is suitably any piece of pre-written code that defines interfaces that can be called to provide the functionality that the component encapsulates. SCs are typically packaged in "industry standard" ways such that they are callable from multiple languages, or from multiple environments. The computer-readable code, in the case of SCs is suitably a unit of independent deployment that has no persistent state. As such, it provides seamless integration with existing development tools, such Forte for Java or Microsoft Visual Studio. SCs are suitably used out-of-the-box, or extended and specialized by developers as desired. It should be noted that the SCs of the present invention are suitably designed for any language binding, such as Common Object Request Broker Architecture ("CORBA"), .NET, COM, DCOM, C++, ActiveX, etc., as will be appreciated by those skilled in the art.

The at least one property upon which the at least one condition is based is suitably related to document data received by the DMM 116. The document data property is suitably any of the following, or combinations thereof: annotation, application type, author, client, comment, creator, creation date, date completed, department, description, destination, document number, document type, group, language, manager, modified date, owner, priority, project, purpose, size, status, and version.

In addition, the at least one property is also suitably based on calendar information, such as the current date or time. Furthermore, the at least one property is suitably based on information related to a storage location in which the received document is to be stored (e.g. the DMM Inbox). For example, the property is suitably any of the following, or combinations thereof: access permission, attribute, available space, last update, name, owner, creation date, and size. Also, the attribute is suitably any of the following, or combinations thereof: compression attributes, read/write attributes, archive attributes, viewing attributes, renaming attributes, and deletion attributes.

Flow then continues to process block 404 wherein an action is selected, preferably by a user. The selection of an action is suitably implemented through the use of computer-readable code. The selected action suitably comprises any of the following, or combinations thereof: printing the document data, faxing the document data, emailing the document data, posting the document data to a web, storing the document data in a specified location, and generating a message. In other words, the action suitably involves invoking either of the DMM 116 or the DDM 114 to store, organize or distribute the document.

The combination of the at least one selected condition based on the at least one selected property with the at least one selected action suitably defines a rule.

Progression then continues to process block 406 wherein document data representative of a document is received at an Inbox. In order for the document data to be received at the Inbox, it is suitably sent or routed from another device or location, either on the DMP 102, or on a device communicatively coupled to data transport network 100. For example, a user of a computer 104 creates a document in a software program, such as a word processing program, for storage in the repository by the DMM 116. The newly created document is then sent via the computer 104 and routed to the DMP 102. The specific document distribution functionality, such as distribution to an email server, printer, fax, etc., is described above. The rules suitably call the distribution functionality.

Flow continues to decision block 408 wherein a determination is made whether the at least one condition based on the at least one rule is satisfied. The RM suitably analyzes the selected property and compares it to a corresponding current system property, such as a property related to document data, a calendar property, or a property related to a storage space, as will be appreciated by those skilled in the art. A negative determination at decision block 408 causes progression to flow back to process block 406, wherein the RM preferably analyzes the next document sent to the Inbox.

A positive determination at decision block 408 means that upon receipt of document data, a condition of at least one of the predefined rules has been satisfied and progression then flows to process block 410 wherein the action associated with the satisfied condition is invoked. Progression then flows to termination block 410.

Although system as described runs on a network appliance, it is appreciated that it can also run on other operating systems, for example, Linux (and other Unix operating systems), and OS by Apple Computers. Furthermore, while a presently preferred embodiment has been described in detail, it should be understood that various changes, substitutions and alterations could be made therein without departing from the spirit and scope of the invention as defined by the appended claims.

What is claimed is:

1. A method for directed routing of electronic documents comprising the steps of:

receiving a plurality of electronic documents of different types, each received electronic document including at least one identifiable electronic document property attribute, wherein at least one electronic document is stored within an associated document management system and at least one electronic document is stored outside of the associated document management system, and wherein a storage location of each electronic document is reflected by its associated electronic document property attribute;

receiving, from an associated user, at least one user-specified routing destination for a plurality of selected electronic documents;

analyzing at least one property associated with each selected electronic document;

identifying an electronic document property attribute associated with each selected electronic document;

identifying at least one destination as being within the document management system in accordance with the specified electronic document property attribute and the user-specified routing destination;

identifying at least one destination as being outside the document management system in accordance with the specified electronic document property attribute and the user-specified routing destination;

selectively converting each electronic document to a format corresponding to the at least one destination in accordance with the step of identifying so as to selectively import or export electronic documents from the document management system such that metadata associated with each electronic document is maintained for documents communicated to the document management system and metadata is not retained for documents communicated outside of the document management system; and outputting each received electronic document to an identified destination in accordance with an associated electronic document property attribute.

2. The method of claim 1 wherein the user-specified routing destination is at least one of a source address and a destination address.

3. The method of claim 1 wherein the identified destination includes at least one of a second destination address and a data storage location.

4. The method of claim 1 wherein the electronic document property attribute is data related to the electronic document selected from the group consisting of annotation, application type, author, client, comment, creator, creation date, date completed, department, description, destination, document number, document type, group, language, modified date, owner, priority, project, purpose, size, status, version, and combinations thereof.

5. The method of claim 1 wherein the electronic document property attribute is data representative of calendar information associated with the electronic document.

6. The method of claim 1 wherein the user-specified routing destination is data representative of destination address.

7. The method of claim 6 wherein the data representative of the destination address is selected from the group consisting of access permission, available space, last update, user name of destination, creation data, size, compression parameters, read/write parameters, archive parameters, viewing parameters, renaming parameters, and deletion parameters.

8. A system for directed routing of electronic documents comprising:

means adapted for receiving a plurality of electronic documents of different types, each received electronic document including at least one identifiable electronic document property attribute, wherein at least one electronic document is stored within an associated document management system and at least one electronic document is stored outside of the associated document management system, and wherein a storage location of each electronic document is reflected by its associated electronic document property attribute;

means adapted for receiving, from an associated user, at least one user-specified routing destination for plurality of selected electronic documents;

means adapted for analyzing at least one property associated with each selected electronic document;

means adapted for identifying an electronic document property attribute associated with each selected electronic document;

means adapted for identifying at least one destination as being within the document management system in accordance with the specified electronic document property attribute and the user-specified routing destination;

means adapted for identifying at least one destination as being outside the document management system in accordance with the specified electronic document property attribute and the user-specified routing destination;

means adapted for selectively converting received electronic documents to a format corresponding to the at least one destination in accordance with the means adapted for identifying at least one destination so as to selectively import or export electronic documents from the document management system such that metadata associated with each electronic document is maintained for documents communicated to the document management system and metadata is not retained for documents communicated outside of the document management system; and means adapted for outputting each received electronic document to an identified destination in accordance with each associated electronic document property attribute.

9. The system of claim 8 wherein the user-specified routing destination is at least one of a source address and a destination address.

10. The system of claim 8 wherein the identified destination includes at least one of a second destination address and a data storage location.

11. The system of claim 8 wherein the electronic document property attribute is data related to the electronic document selected from the group consisting of annotation, application type, author, client, comment, creator, creation date, date completed, department, description, destination, document number, document type, group, language, modified date, owner, priority, project, purpose, size, status, version, and combinations thereof.

12. The system of claim 8 wherein the electronic document property attribute is data representative of calendar information associated with the electronic document.

13. The system of claim 8 wherein the user-specified routing destination is data representative of destination address.

14. The system of claim 13 wherein the data representative of the destination address is selected from the group consisting of access permission, available space, last update, user name of destination, creation data, size, compression parameters, read/write parameters, archive parameters, viewing parameters, renaming parameters, and deletion parameters.

* * * * *

UNITED STATES PATENT AND TRADEMARK OFFICE
CERTIFICATE OF CORRECTION

| | | |
|---|---|---|
| PATENT NO. | : 7,532,340 B2 | Page 1 of 1 |
| APPLICATION NO. | : 10/125856 | |
| DATED | : May 12, 2009 | |
| INVENTOR(S) | : George Koppich, Michael Yeung and Louis Ormond | |

It is certified that error appears in the above-identified patent and that said Letters Patent is hereby corrected as shown below:

Title page, item [75] Inventors should be listed as: George Koppich, Palos Verdes Estates, CA (US); Michael Yeung, Mission Viejo, CA (US); Louis Ormond, Irvine, CA (US)

Signed and Sealed this

Eighteenth Day of August, 2009

David J. Kappos
*Director of the United States Patent and Trademark Office*